Patented May 10, 1927.

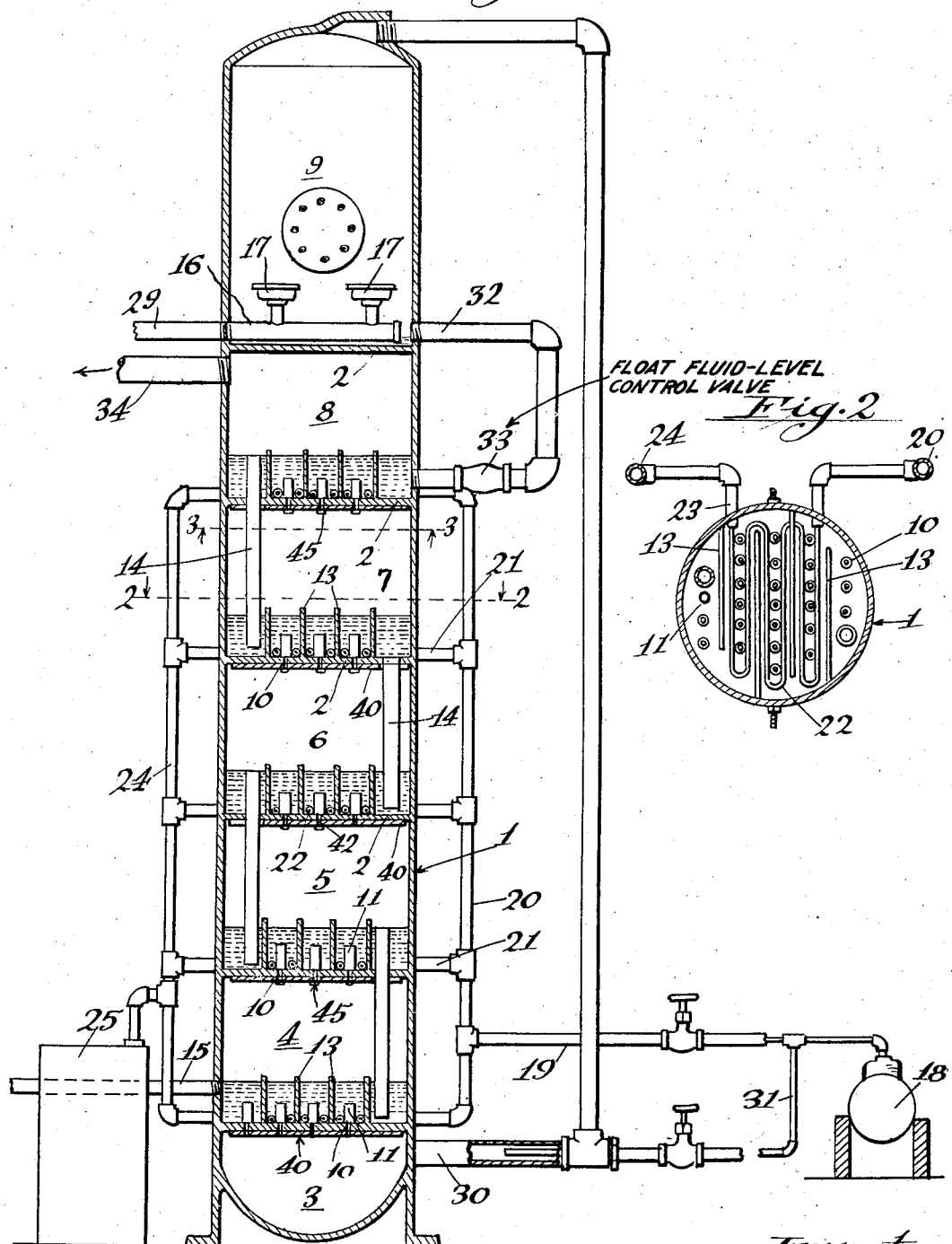

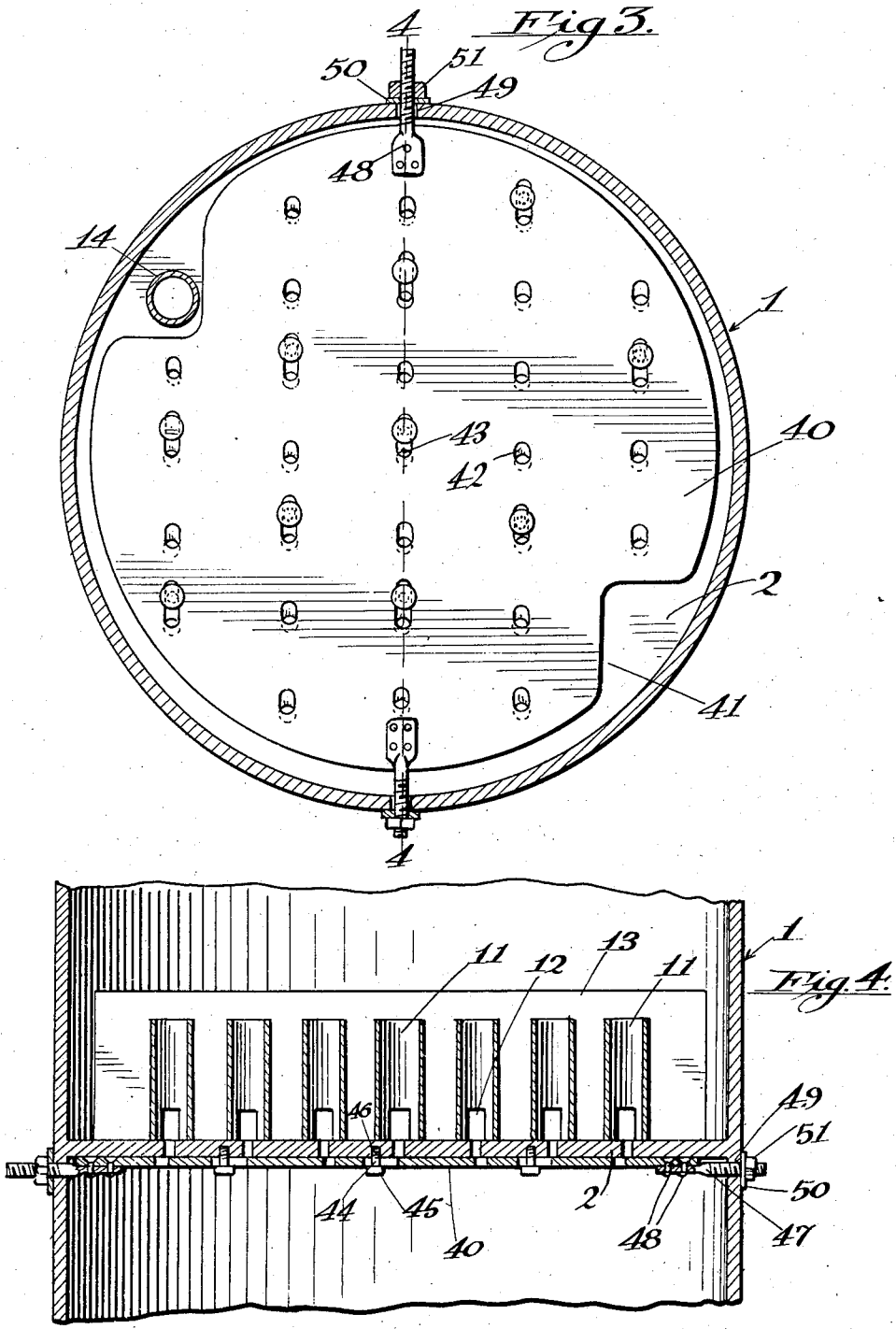

1,628,055

UNITED STATES PATENT OFFICE.

DANIEL L. NEWTON, OF FULLERTON, CALIFORNIA.

APPARATUS FOR ABSORPTION AND DISTILLING OF HYDROCARBONS.

Application filed December 9, 1925. Serial No. 74,280.

My invention is an apparatus for the absorption and distilling of hydrocarbons.

My invention relates to an apparatus for a continuous process of distilling and blending hydrocarbons and especially gasoline distilled from an absorbing medium, in particular the distilling and blending of gasoline from casing head gas absorbed in a hydrocarbon medium.

It is an object of this invention to provide a simple and efficient apparatus which not only quickly separates and distills the gasoline dissolved in an absorbing medium, but repeatedly blends the constituents composing commercial gasoline in such a manner as to produce a more stable motor fuel which has no tendency to lose any substantial part of its more volatile constituents by evaporation in the ordinary handling of the same. Unless the gasoline is blended in this manner, and this is especially true in regard to casing head gasoline, a considerable part of the casing head gasoline is lost by evaporation.

A particular feature of my invention is controlling the rate of flow of the gas and vapors through the absorbing medium in its upward travel through the apparatus. In order to accomplish this, I pass the gas and vapors containing gasoline up through the absorbing medium by allowing it to pass through a series of perforations in horizontal partitions and by means of a sliding plate placed below the partition having perforations I move the plate so that two series of perforations register full or partly cut off each other, thereby controlling the flow of the gas and vapors containing gasoline through the distilling apparatus.

With the above and other objects in view, which will appear from the following detailed description my invention consists in the construction and arrangement of parts hereinafter described and claimed.

In the accompanying drawings which form a part of the specification, I have illustrated my impoved apparatus, in which:

Figure 1 is a vertical cross section of the apparatus,

Fig. 2 is a horizontal cross section taken on the line 2—2 of Fig. 1.

Fig. 3 is a bottom plan view of one of the partitions, showing my slidable plate for controlling the register of the apertures.

Fig. 4 is a vertical section on the line 4—4 of Fig. 3.

Referring to the drawings in which similar reference characters designate similar parts, the numeral 1 designates a vertical cylindrical shell divided by horizontal partitions 2 into a series of compartments or chambers. The lowest chamber 3 is a gasoline vapor supply chamber; 4, 5, 6, 7 and 8 are distilling and blending chambers; while the chamber 9 above the chamber 8 is a distilling chamber only.

The bottom partition of each of the distilling and blending chambers 4, 5, 6, 7 and 8 is provided with a series of perforations 10, which open into cylindrical recirculating jet tubes 11, open at the top and provided at the bottom adjacent the partition 2 with side openings 12, as shown in Fig. 4. The tubes 11 are arranged in parallel rows which are divided by vertical baffle plates 13. The baffle plates are slightly more than twice the height of the tubes 11. There is an overflow pipe 14 leading from each of the distilling and blending chambers 8, 7, 6 and 5 to the distilling and blending chamber immediately below. Each overflow pipe 14 is so arranged that its upper end extends to a height twice the height of the tubes 11 so that the level of the liquid in each of the chambers 4, 5, 6, 7 and 8 will be maintained at twice the height of the said tubes 11. From the lowest distilling and blending chamber 4 an outlet pipe 15 conducts the absorbing medium to a supply tank or absorption apparatus (not shown).

The distilling chamber 9 is provided with a manifold 16 provided with a series of openings in which spraying nozzles 17 are disposed. Means for maintaining the necessary temperature in the blending chambers 4 to 8 inclusive is provided by a boiler 18 from which the steam is conducted by a valved supply pipe 19 leading to a header pipe 20 from which branch pipes 21 lead to each of the distilling and blending chambers 4, 5, 6, 7 and 8. A steam coil 22 is arranged between the baffle plates 13 of each chamber 4 to 8 inclusive, and connected to a steam exhaust pipe 23 leading into an exhaust header pipe 24 communicating with a steam trap 25.

The absorbing medium, such as kerosene, stove distillate or other suitable medium, charged with gasoline which is to be subjected to the distilling and blending treatment, enters the distilling chamber 9 by means of the manifold 16, through the supply pipe 29 under a pressure sufficient to operate sprays 17. The medium preferably preheated at a temperature from 150 to 400° F. is forced through the nozzles 17 where it is atomized in the chamber 9 and the combined action of heat and atomization will liberate about 50% of the gasoline dissolved in the medium. The portion of the gasoline distilled in the chamber 9 contains substantially all the more volatile portions of the gasoline. The gasoline vapors pass from the distilling chamber 9 through a pipe 30 to the supply chamber 3 at the bottom of the apparatus. Before entering the chamber 3 live steam at a temperature of 215° F. and upward is introduced by means of a steam supply pipe 31. The mixture of live steam and gasoline vapors passes from the chamber 3 into the first distilling and blending chamber 4 through the perforations 10 to the recirculating jet tubes 11, where it comes in intimate contact with the absorbing medium whence the vapor mixture is successively conducted from the distilling chamber to each of the distilling and blending chambers 5, 6, 7 and 8. The absorbing medium in the distilling chamber 9 passes through an outlet pipe 32 to the distilling and blending chamber 8 immediately below.

To prevent any gasoline vapors from passing through the pipe 32, I provide a fluid level control float valve 33, which permits the medium only but not any gas or vapors to pass from chamber 9 to chamber 8. The medium passes successively from the distilling and blending chambers 8 to 4 inclusive, through the overflow pipes 14.

The particular arrangement for controlling the flow of gases or vapors upwardly through the partitions is indicated specifically in Figs. 3 and 4. A valve plate 40 forms a false bottom for the partitions 2; this plate is substantially the contour of the interior of the shell, being slightly smaller than the partitions. A cut out section 41 allows the overflow pipes 14 to pass upwardly through the valve plate 40. As these overflow pipes 14 are staggered as shown in Fig. 1, it is advisable to form two cut out sections 41 so that the plates will not be required to be made in rights and lefts; however, this is immaterial as there is only one overflow pipe extending through the various blending chambers 4, 5, 6 and 7.

The valve plate is provided with a plurality of short slots 42 and elongated slots 43; these being adapted to register with the perforations 10 formed in the partitions 2. A series of studs 44, having heads 45, pass through the elongated slots 43 and are screw threaded into the threaded socket 46 in the partitions 2. These studs therefore hold the valve plate in close relation to the underside of the partitions 2.

A pair of controlling bolts 47 are secured to the valve plate at opposite sides and are shown secured by rivets 48. These bolts pass through apertures 49 in the shell. A washer 50 preferably of gas-tight material is placed on the outside of the shell surrounding the bolts and adjusting nuts 51 are threaded on the bolts engaging the washers and functioning to adjust the plate.

In order to change the opening of the perforations 10 through which the gas and vapors may pass upwardly, the valve plate 40 is slid transversely of the partitions by loosening the nut on the bolt on one side of the plate and tightening the nut on the other side. By this means very accurate adjustment can be made of the perforations in the partition and the slots in the valve plate. It is a simple matter therefore to give a full opening the size of the perforations 10 or to cut this down to any desired amount by moving the valve plate.

As the pressure of the gas and vapors as being passed through the distilling apparatus varies considerably, especially when direct casing head gas is used, it is necessary to change the size of these openings quickly in order to secure the proper distillation and separation of the gasoline from the vapors. I find the most satisfactory velocity of the gas and vapors through the absorbing medium, is substantially 75 feet per minute. This can readily be regulated by the movement of the valve plate.

The mixture of live steam and gasoline vapor in passing through the recirculating jet tubes 11 will thrown the medium upwardly and there will be a constant reentering of the medium through openings 12 of the tubes 11 and a violent agitation resembling boiling will take place in each of the distilling and blending chambers 4 to 8 inclusive. From the topmost distilling and blending chamber 8 an outlet pipe 34 conducts the vapors to a condenser (not shown).

In the process just described, the absorbing medium is first preheated, then introduced under pressure in the distilling chamber 9 where it is thoroughly atomized. The gasoline vapors mixed with live steam will now pass successively through a series of distilling and blending chambers 4 to 8 inclusive, which form an important part of my invention and in which the distillation of the gasoline is completed and the blending of the gasoline is effected. In each of these distilling and blending chambers, the gasoline vapors are repeatedly and intimately mixed with one another and kept at a temperature by means of the heat supply steam coil 22, so as to effect a stabilizing action on the gasoline produced, preventing much of the loss due to volatilization of casing head gasoline which takes place where no such blending action during the distilling process is effected.

The gasoline obtained in this process compares well with the gasoline produced by the cracking process in the stability of the product; and furthermore by the use of the counter-current principle in which the absorbing medium is successively conducted from one chamber to another against a current of steam and gasoline vapors passing in the opposite direction, a thorough and rapid extraction of all the gasoline contained in the absorbing medium is effected so that when the absorbing medium leaves the lowest distilling and blending chamber 4, it is substantially denuded of all gasoline vapors absorbed.

In cases where the absorbing medium is kerosene, stove distillate, or similar cheap by-products, a portion which may reach as high as 20% of the absorbing medium is blended with and incorporated in the gasoline distilled therefrom and remains a stable constituent of the final product of the motor fuel produced. In this manner commercial gasoline is made directly in one distilling operation from natural gas dissolved in a medium and the yield of the final product is increased beyond the volume of gasoline vapors absorbed by the medium for the reason that the part of the medium itself becomes a constituent part of the commercial gasoline.

My valve plate for controlling the flow of the vapors through the absorbing medium is illustrated as applied to an apparatus for distilling and blending hydrocarbons as disclosed in my prior application No. 726,986 filed July 19, 1924 which matured into Patent 1,567,458, December 29, 1925 and in connection with the process disclosed in my application No. 726,985 filed July 19, 1924 which matured into Patent 1,567,457, December 29, 1925. The particular valve and the manner of using it to control the process may therefore be considered as a specific improvement on the above mentioned apparatus and process.

However, it is to be understood that my type of valve plate forming a means for controlling the rate of flow of vapors through liquid absorbing medium may be adapted to other types of appliances and processes for absorbing the contained liquids in gaseous vapors or the like. Such general application is to be understood as being within the spirit of my invention as set forth in the description, drawings and claims.

Having described my invention, what I claim is:

1. In an apparatus for absorbing and distilling hydrocarbons, a vertical cylindrical shell having a partition with perforations therethrough, said partition being adapted to sustain liquid thereon and the perforations to pass gas upwardly, a valve plate having a series of openings therethrough, slidably connected to the partition, and a controlling bolt attached to the valve plate and extending through the shell with a nut on the outside of the shell to adjust the valve plate.

2. In an absorbing, distilling and blending apparatus a chamber having a partition forming a bottom, the chamber being adapted to contain a liquid medium on the partition, the said partition having a series of perforations to allow upward flow of gases containing vapors, a valve plate having a series of openings therethrough, slidably mounted on the lower surface of the partition and means to slide the valve plate to vary the size of the openings into the said chamber.

3. A distilling and blending apparatus comprising a shell, a partition therein forming a blending chamber above the partition adapted to contain an absorbing liquid medium, a series of perforations in the partition, a slidable valve plate of smaller area than the partition, said valve plate having a series of slots therethrough, studs extending through some of said slots and securing said plate on the lower surface of the partition, control bolts attached to the opposite sides of the valve plate, extending through the shell and means on the outside of the shell to slide the said valve plate.

4. A distilling and blending apparatus comprising in combination a series of blending chambers each having a partition adapted to hold an absorbing liquid medium, each of said partitions having perforations adapted to allow passage upward of gas containing vapors from one chamber to another, and means operatively connected to each partition to control the flow of gas into each chamber, independently of the rate of flow into other chambers.

5. A distilling and blending apparatus comprising in combination a vertical shell, a series of transverse partitions therein, each partition being adapted to retain an absorbing liquid medium and form a blending chamber above each partition, each partition having a series of perforations adapted to pass gas containing vapor into the absorbing medium on the various partitions, one after the other in passing upwardly, and valve plates slidably mounted on each partition, adapted to control the rate of flow through the said partitions, one independently of the other.

In testimony whereof I have signed my name to this specification.

D. L. NEWTON.